United States Patent [19]

Robinson et al.

[11] 3,841,810
[45] Oct. 15, 1974

[54] APPARATUS FOR DETECTION OF SHIELD IMPERFECTIONS IN ELECTRICAL CONDUCTORS

[75] Inventors: Daniel E. Robinson, Metuchen; Robert A. Schmidt, Denville, both of N.J.

[73] Assignee: General Cable Corporation, New York, N.Y.

[22] Filed: Sept. 25, 1972

[21] Appl. No.: 291,641

[52] U.S. Cl. .................. 425/113, 324/54, 425/141, 425/169
[51] Int. Cl. .............................................. B29f 3/00
[58] Field of Search ........ 425/141, 169, 113, 174.6; 164/150; 324/54

[56] References Cited
UNITED STATES PATENTS

| | | |
|---|---|---|
| 2,928,123 | 3/1960 | Ramsey .............................. 425/113 |
| 3,045,281 | 7/1962 | Skobel ................................ 425/113 |
| 3,502,752 | 3/1970 | Brown ............................. 425/141 X |
| 3,710,241 | 1/1973 | Dineen ................................. 324/54 |

*Primary Examiner*—J. Spencer Overholser
*Assistant Examiner*—David B. Smith

[57] ABSTRACT

This invention uses a tip, or tip assembly, of an extrusion die as an electrode for detecting skips or other imperfections in the strand shield on the conductor of an electrical cable. The tip is insulated from the extruder, or otherwise insulated from ground, so that some electrical potential can be maintained on the tip. Changes between the tip potential and that of the extruder or ground are used to detect defects in the strand shield on the cable. Defects in the strand shield are detected and the location recorded by the detector, and can be detected and recorded on a tape or other record so that the location of the defect along the length of the cable is known.

10 Claims, 10 Drawing Figures

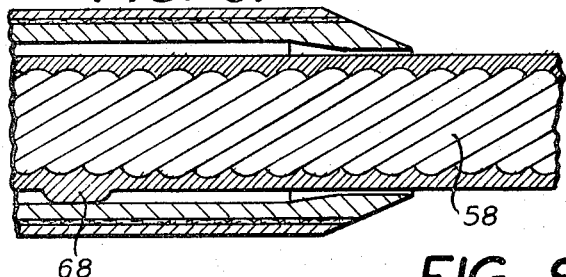
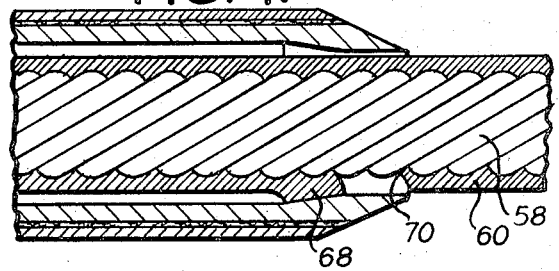
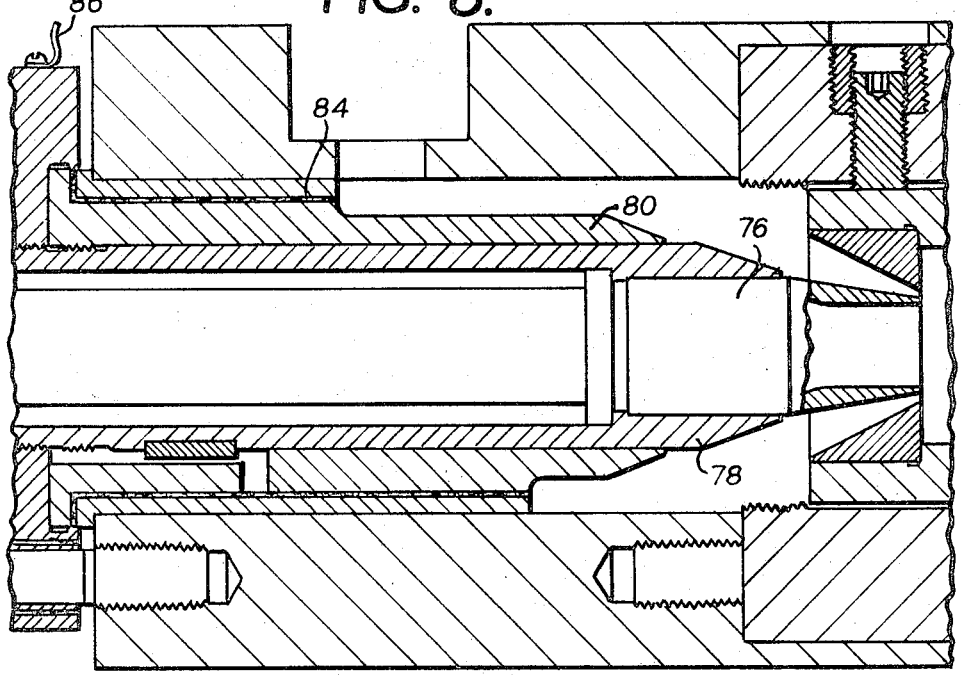
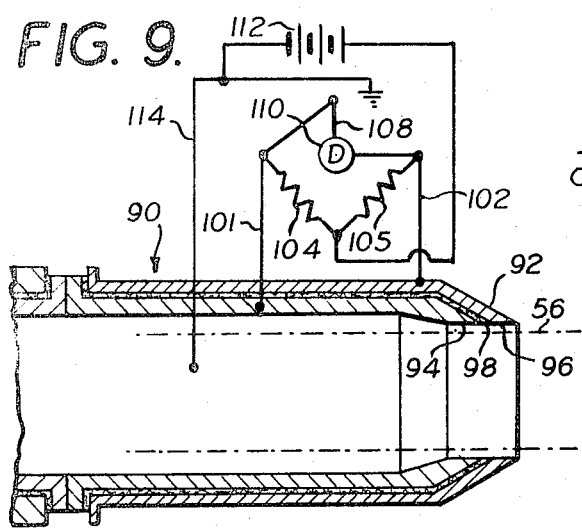
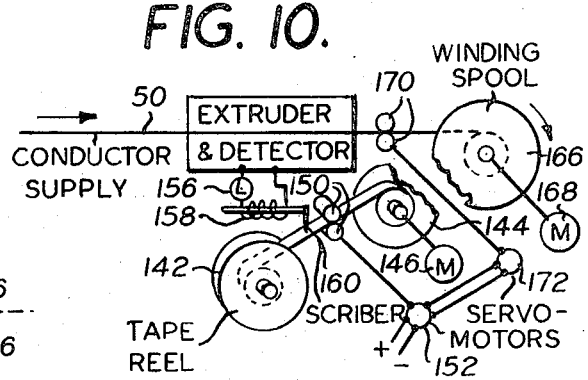

3,841,810

APPARATUS FOR DETECTION OF SHIELD IMPERFECTIONS IN ELECTRICAL CONDUCTORS

BACKGROUND AND SUMMARY OF THE INVENTION

Prior to the development of this invention, skips and other defects in the semi-conductive strand shield on electrical cables were detected by visual inspection before the application of insulation, or by "corona" test (apparent discharge characteristic) on finished cables. Experience has shown that these methods are inadequate, since some of the skips or other defects escape the usual detection, and the insulation may be in good enough contact with the strand during the corona test to prevent detection by that means.

A device to sense skips, tears, or protuberances in the semi-conductive material compromising the strand shield, employing an insulated extruder tip and tip retainer, is provided by this invention. The passage of a skip, tear, or protuberance through the tip changes the resistance between the tip and the shielded conductor; and this change in resistance is used in a bridge circuit to operate a detector and may also operate a recorder for indicating the location of the defect along the length of the cable.

The invention simply monitors or measures the shield resistance or conductivity between the tip and conductor strand under normal extrusion conditions. The conductor, coated with semi-conduction material, floats in the tip making light contact, or at least steady and regular contact as it passes through the tip. The average voltage drop is set at one-half the bias voltage by adjusting a potentiometer, or by other appropriate means. A lump or skip in the extruded strand shield changes this regular pattern abruptly since the resistance between the tip and strand changes radically as the abnormality passes the downstream end of the tip.

The invention can be used with special tips having inner and outer surfaces insulated from one another; or with a standard tip where the tip, tip retainer and tip holder are isolated from the rest of the extruder by providing an insulation section between the inner and outer surface of the assembly holder.

A method of applying a thin inexpensive non-conducting ceramic or vitreous coating over the outer surface of a tip and tip retainer, or outer surface of the whole assembly holder (i.e., tip, tip retainer and tip holder) will accomplish the same insulation and allow the tip to be employed as an electrode. Therefore, any means employed to insure a potential difference between the cable conductor and the tip may be considered including insulating the whole extruder on insulated shock mounts, however the absence of grounding the machine may be something of an electrical shock hazard.

In its broadest aspects, this invention can be used with a tip which is not a part of an extruder; but the combining of the invention with extruder mechanism provides more efficient operation and utilizes extruder structure which is a necessary part of the extruder.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 6 is a view similar to FIG. 2 but showing still another type of defect passing along the inside of the tip;

FIG. 7 shows the tearing of the shielding when the defect shown in FIG. 6 reaches the end of the tip;

FIG. 8 is a sectional view showing the invention applied to an extruder which has a conventional tip;

FIG. 9 shows a modified form of a tip for use with this invention; and

FIG. 10 is a diagrammatic view showing the invention with a detector that operates a scriber on a tape record to indicate the location of defects along the length of a cable.

DESCRIPTION OF PREFERRED EMBODIMENT

Figure 1:
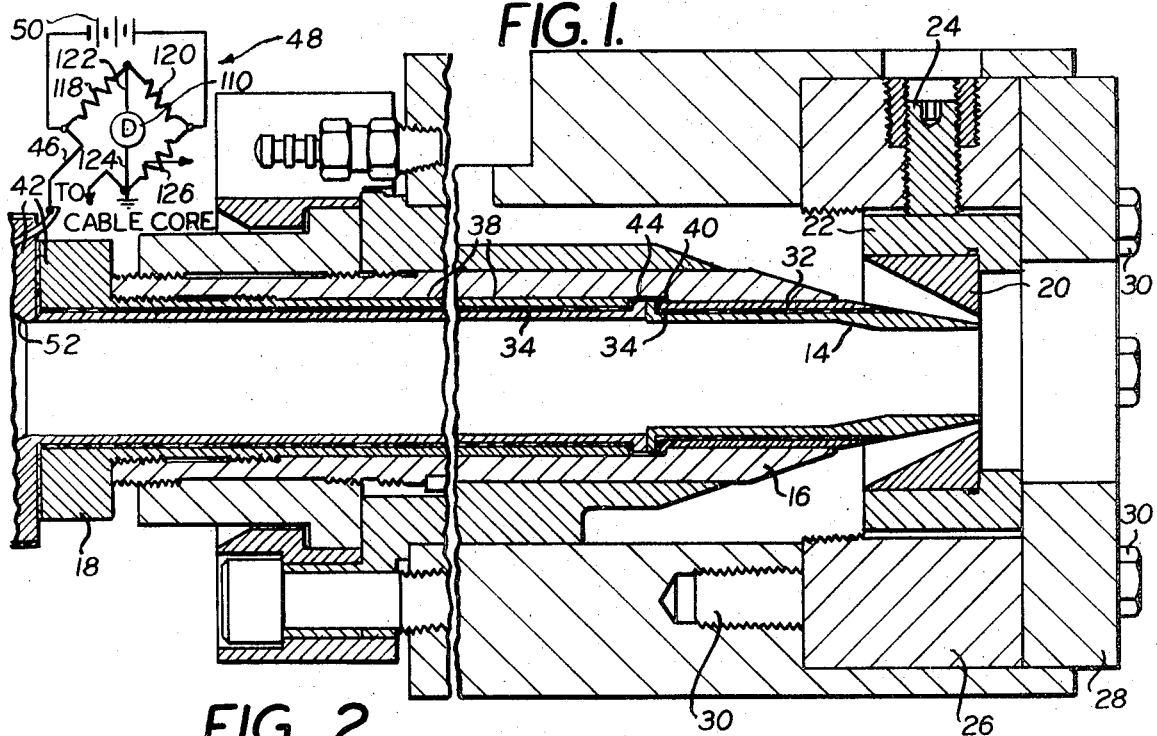
FIG. 1 is a fragmentary view in section of an extruder with a tip made in accordance with this invention and connected with detector mechanism which is shown diagrammatically.

FIG. 1 shows a cross head 10 of an extruder 12. The extruder has a tip 14 located in a tip holder 16 and having a tip retainer 18 at the upstream end of the tip 14.

The tip 14 is located in an extruder die 20 held in a ring 22 that can be adjusted with respect to the axis of the tip 14 by set screws 24 threaded through an outer ring 26 which is clamped to the cross head 10 by a retainer ring 28. This retainer ring 28 is attached to the main body of the cross head 10 by a circle of screws 30.

The extruder construction described thus far is conventional, but the tip 14 is of unique construction in that it has an outer portion 32 which is insulated from the inner portion of the tip by electrical insulation 34 which is preferably fiberglass, but which may be other non-conducting ceramic or vitreous coating. The tip retainer 18 is of similar construction and has an outer portion 38 which constitutes a sleeve surrounding the rest of the tip retainer 18 and which is insulated from the rest of the tip retainer 18 by a layer of electrical insulation 34. This insulation 34 extends to the outer radial limits of flanges 40 and 42 which are located at the upstream ends of the tip 14 and tip retainer 18, respectively.

The inside surfaces of the tip 14 and the tip retainer 18 are, therefore, insulated from the tip holder 16. It should be noted that the portion of the flange 40 which constitutes part of the inner portion of the tip 14 is of somewhat reduced diameter so as not to contact with the inside surface of the tip holder 16; and the same is true of the flange 42 at the downstream end of the tip retainer 18.

The inner portions of the tip 14 and tip retainer 18 contact with one another at the flanges 40 and 42 so as to provide continuous electrical continuity. The portion of the flange 42 which extends outward from the inner part of the tip retainer 18 has an electrical connection 46 with a detector 48 which will be described subsequently. For the present it is sufficient to understand that a battery 50 imposes an electrical potential through the conductor 46 on the inside portions of the tip 14 and tip retainer 18.

The cable conductor with its conductor shield enters the hollow interior of the tip retainer 18 at a tapered upstream end 52 and travels through the tip retainer 18 and the extruder tip 14 with continuous motion in accordance with conventional practice in extruder operation. This conductor and conductor shielding is shown in FIG. 2.

Figure 2:
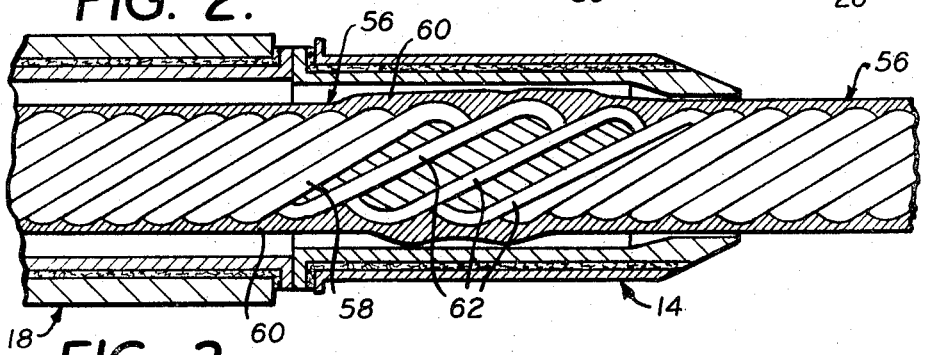
FIG. 2 is a greatly enlarged sectional view showing a shielded conductor coming through the tip of FIG. 1 and with an imperfection of the conductor approaching the discharge end of the tip.

FIG. 2 shows a shielded conductor 56 which comprises a stranded wire conductor 58 covered by a semiconducting shield 60. The shielded conductor 56 shown in FIG. 2 has a defect which is known as "bird caging." This defect consists of strands 62 which are distorted so that they do not lie against the underlying strands and have the effect of increasing the diameter of the shielded conductor 56 along the portion of the conductor where bird caging has occurred. This causes the shielding 60 to be of excessive outside diameter along the portion of the conductor having this bird caging defect. Beyond the bird caging, the outside diameter of the shielded conductor 56 is somewhat less than the inside diameter of the tip retainer 18 and the tip 14. At the discharge end of the tip 14, the walls of the tip converge so that the opening at the discharge end of the tip has a diameter substantially equal to the intended diameter of the shielded conductor 56. In FIG. 2, the shielded conductor is shown passing through the tip retainer and tip without touching the surrounding cylindrical surfaces except where the tip is of reduced diameter at the discharge end. Under some circumstances the shielding 60 on the outside of the conductor 58 may touch the inside surface of the tip retainer 18 or the tip 14, or both, but this does not interfere with the operation of the invention.

Figure 3:
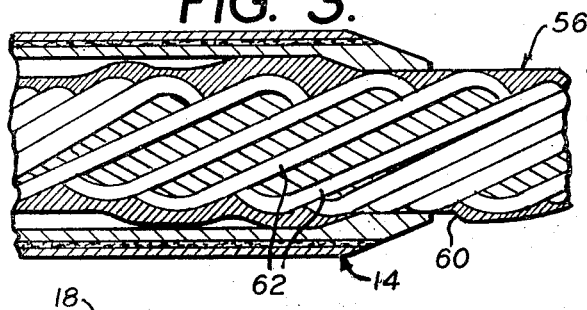
FIG. 3 shows the tearing of the shield when the defect shown in FIG. 2 reaches the discharge end of the tip.

FIG. 3 shows the same shielded conductor 56 after it has traveled a short distance further toward the discharge end of the tip 14. The force required to pull the oversize portion of the shielded conductor 56 through the discharge end of the tip 40 is so great that the shielding 60 tears and permits portions of the bare conductor strands 62 to contact with the inside surface of the tip 14. This changes the potential between the tip and the conductor 58 which is at ground potential. Even if the bird caging is not severe enough to cause the shielding 60 to tear, the substantial pressure of the oversize shielding passing through the downstream end of the tip 14 changes the electrical resistance and consequently the current flow between the tip and the conductor sufficiently to operate detection equipment which will be described.

Figure 5:
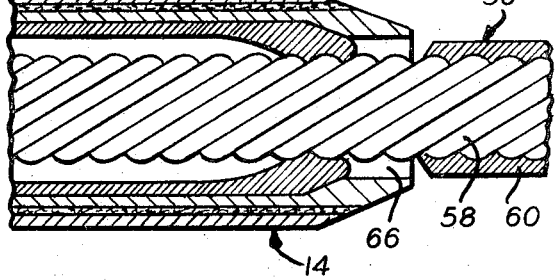
FIG. 5 shows the tearing of the shielding on the conductor when the defect of FIG. 4 reaches the end of the tip.
Figure 4:
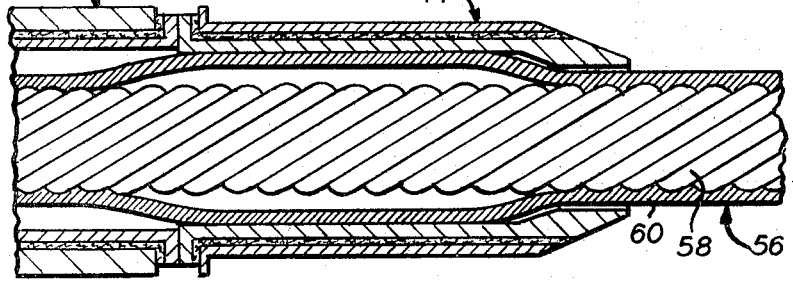
FIG. 4 is a view similar to FIG. 2 but showing a different type of defect approaching the end of the tip.

FIG. 4 is a view similar to FIG. 2 but showing a different kind of defect in the shielded conductor 56. FIG. 4 shows the conductor 58 with the semi-conducting shielding 60 "ballooned" (a condition in which air is trapped inside and/or poor adhesion to the conductor is experienced) causing the shielding 40 to have a larger diameter than the outlet of the tip 14. When the ballooned portion of the shielding 60 attempts to pass through the downstream end of the tip 14, the resistance encountered causes the shielding 60 to tear, as shown in FIG. 5 and to thus cause a skip 66 in the shielding. This may cause the bare conductor 58 to touch the tip or it might only result in the ballooned portion of the shielding 60 pulling through the downstream end of the tip 14 with substantial pressure against the inside of the tip 14 so that the pressure of the semiconducting shielding 60 reduces the potential of the tip sufficiently to actuate the detector mechanism.

FIG. 6 shows the insulated conductor 56 with a lesser defect than in FIGS. 2 – 5 consisting of a lump 68 at one side of the shielded conductor. This lump is large enough to offer a substantial increase in the pull of the shielding 60, the shielding will tear and leave a skip 70 which is localized at the region of the lump 68, but which does not extend all the way around the shielded conductor as in the case of FIGS. 3 and 5. If the skip 70 is large enough it may permit the bare conductor to touch the surface of the tip and ground the tip. Even if there is no contact between the bare metal of the conductor and the wall of the tip, the lump 68 causes substantial increase in pressure of the shielding 68 against the inside surface of the tip as the lump passes through the downstream end of the tip and this increase in pressure reduces the resistance between the tip and the conductor 58 so that more current flows from the tip to the conductor and the defect detector of the invention operates.

FIG. 8 shows a modified construction from that illustrated in FIG. 1. An extruder 74 has a tip 76 which is of conventional construction. The tip 76 is held in a tip holder 78 surrounded by another cylindrical element 80 which makes up the tip assembly of the extruder 74. The inside surface of the tip 76 is not insulated from the outside of the tip or from the tip holder 78, or even from the surrounding element 80 but all of these parts are insulated from the rest of the extruder by electrical insulation 84 as shown in FIG. 8. The entire tip assembly comprising the tip 76, tip holder 78 and surrounding element 80 serve as the electrode; but the tip 76 itself is the active element of the electrode since it is the portion which is close to the grounded conductor which passes through the discharge end of the tip. It will be understood that the interior construction of the tip insofar as diameter with reduction in diameter at the downstream end is the same as in FIGS. 1 – 7. A conductor 86 connects with the detector and also supplies the voltage potential for the tip assembly.

FIG. 9 shows a modified tip indicated generally by the reference character 90; a shielded conductor 56 is shown in phantom in FIG. 9. The difference in construction of the tip 90, as compared with tips previously illustrated in the other figures is that the tip 90 has an outer portion 92 which extends inward to the reduced diameter outlet at the downstream end of the tip. As a result of this construction, the outlet end of the tip 90 has a conducting surface 94 axially spaced from another conducting surface 96 but with these surfaces insulated from one another by insulation 98 which separates the inner portion of the tip 90 from its outer portion; the construction being similar to the other figures except for the extent of the insulation 98 and the outer portion 96 inwardly to form part of the wall of the outlet passage of the downstream end of the tip 90.

There are conductors 101 and 102 connecting the inner and outer portions, respectively of the tip 90 to resistance legs 104 and 105, respectively, of a bridge circuit. The ends of the resistance legs 104 and 105 of the bridge are connected together and connect with a detector circuit 108. A detector 110 is indicated by the letter D.

A battery 112 has its opposite sides connected with the resistance legs 104 and 105, respectively, at the ends of these resistance legs which are remote from their connection with each other. The battery 112 thus impresses a potential difference on the faces 94 and 96 at the downstream end of the tip 90.

The conductor 108 is grounded at the end remote from the resistance legs 104 and 105 of the bridge circuit, and the conductor 56 is also grounded as indicated by the conductor 114; though it will be understood that the actual grounding of the conductor 56 is at a different location from that shown by the wiring diagram in FIG. 9.

In practice, the conductor 56 can be grounded by a conductor making a firm contact with the semiconducting shielding that surrounds the conductor 56 or it can be grounded at a location where the conductor is bare; that is, before the shielding 60 is applied to the conductor.

For the tip 14, shown in FIG. 1, a somewhat different circuit is used from that shown in FIG. 9. Referring again to FIG. 1, the defect detector 110 is shown connected across a bridge circuit which has upper resistance legs 118 and 120 extending downward from opposite sides of a conductor 122 which leads to the detector 110 and then another conductor 124 grounds the bridge at the side opposite the connection of the legs 118 and 120. A potentiometer leg 126 connects the ground contact of the bridge 48 with the lower end of the resistance leg 120. What constitutes the fourth leg of the bridge is the conductor 46 leading to the inside surface of the tip 14 and the ground connection of the bridge and the cable core, that is, the connection, wherever it may be, that grounds the metallic conductor that passes through the tip and that is shown in FIGS. 2 – 7 where it is indicated by the reference character 58.

By using resistances 118 and 120 of equal value, and adjusting the potentiometer 126 to balance the bridge or detector circuit 48, any change in resistance of the remaining leg of the bridge causes a change in potential which actuates the detector 110.

It is shown in FIG. 10 as a block diagram since detectors responsive to a change in voltage are well known and no illustration of such a detector is necessary for a complete understanding of this invention. The change in potential may energize a relay and light a light or operate any other desired signal.

It is a feature of this invention, however, that the detector marks a record which is coordinated with the length of the shielded conductor so that after the conductor has passed through the detecting tip, any defects can subsequently be localized along the length of the detector by referring to the record.

FIG. 10 shows a record consisting of a tape 140 which unwinds from a reel 142 and which winds on another reel 144. The reel 144 is rotated by a torque motor 146 but the actual speed at which the tape 140 winds on the reel 144 is determined by feed rolls 150 between which the tape 140 passes. These feed rolls 150 are driven by a motor 152 and the speed of rotation of the motor 152, and resulting speed of the feed rolls 150, determine the lineal speed at which the tape record 140 is advanced.

The detector, in addition to giving a visible signal by lighting a lamp 156, also energizes a coil 158 which operates as a solenoid to shift a scriber 160 back and forth across a portion of the width of the tape record 140.

When there are only minor changes in the voltage of the detector, the scriber 160 traces a substantially straight line lengthwise of the tape record 140, but whenever a defect is detected, the sudden change in voltage on the detector causes the scriber 160 to draw a "spike" along the line which is traced by the scriber. This indicates on the record the location of a defect in the shielded conductor. If the tape record 140 has graduations corresponding to locations along the shielded conductor, then the position on the shielded conductor of any defect corresponding to a particular spike can be quickly identified. If the tape is not graduated, then measurements are made along the tape to obtain the location of the indicated defect on the shielded conductor.

In order to obtain these results, it is necessary that the tape 140 advance at a rate which corresponds to the rate of advance of the shielded conductor. In FIG. 10 the shielded conductor is shown winding on a spool 166 which is rotated by torque motor 168. The actual rate of advance of the shielded conductor is controlled by feed rolls 170 given by a motor 172. The motors 152 and 172 may be several motors or other driving connections which rotate the feed rolls 150 and 170 at a rate to produce the same lineal speed of advance of the shielded conductor 56 and the tape 140, or a tape speed which is proportional to the shielded conductor speed, for example one half or one third of the shielded conductor speed; the proportion being known at the time that the locations of the spikes on the record are reviewed to find the corresponding defects on the shielded conductor.

It will be understood that the showing in FIG. 10 is entirely diagrammatic and that the location of defects by means of a record made by the defect detector can be done with other types of records and that the structure shown in FIG. 10 is merely representative of means operated at a speed proportional to the shielded conductor speed for recording the locations of defects in the shielded conductor.

Preferred embodiments of the invention have been illustrated and described, but changes and modifications can be made and some features can be used in different combinations without departing from the invention as defined in the claims.

What is claimed is:

1. Apparatus for detecting imperfections in strand shields on electrical cable conductors including in combination an extruder that extrudes a layer of insulation over the strand shield, the extruder comprising a die and a tip within the die and forming with the die an outlet orifice through which the insulation is extruded, the tip having an axial passage through which the strand shielded conductor passes with continuous motion, means for maintaining an electrical potential between the tip and the conductor, and means for detecting changes in current produced by said potential, from a normal current, as a result of variations in resistance between the tip and conductor, an interior surface of the axial passage of the tip being adjacent to the surface of the strand shield on the conductor.

2. The apparatus described in claim 1 characterized by said inside surface of the tip being electrically insulated from the rest of the extruder.

3. The apparatus described in claim 1 characterized by the tip and parts of the apparatus that hold the tip in place being electrically insulated from the rest of the extruder.

4. The apparatus described in claim 1 characterized by the tip having two longitudinally spaced surfaces that are adjacent to the shielded conductor and that are insulated from one another and between which an electrical potential is maintained.

5. The apparatus described in claim 4 characterized by the two surfaces of the tip that are electrically insulated from one another being in position to contact with imperfections in the shielding on the conductor.

6. The apparatus described in claim 1 characterized by the tip having an inside diameter along most of its length that is larger than the outside diameter of the shielded cable, and the downstream end of the tip having a reduced inside diameter substantially equal to the outside diameter of the shielded conductor where the shielded conductor is free of imperfections.

7. The apparatus described in claim 6 characterized by the tip having two longitudinally spaced surfaces that are electrically insulated from one another, both of which surfaces are located along the reduced inside diameter of the tip.

8. The apparatus described in claim 1 characterized by mechanism that passes a shielded conductor through the tip with continuous longitudinal motion, a recorder that operates at a speed proportional to the speed of longitudinal movement of the shielded conductor, and means responsive to the detector for indicating on the record the location of imperfections along the length of the shielded conductor.

9. The apparatus described in claim 8 characterized by the recorder including a record that moves at a rate proportional to the travel of the cable, a scriber that traces a line on the record, an electromagnetic means responsive to the detector for moving the scriber to form spikes in the line whenever an imperfection in the shielding instigates a response from the detector.

10. The apparatus described in claim 9 characterized by the record being a tape that winds on a reel, the tip being part of an extruder that applies a jacket of insulation over the shielding on the conductor, means for wrapping the insulated cable on a spool, and coordinated motor means that wind the cable and the tape at longitudinal speeds proportional to one another whereby the record indicates the location along the length of the cable where any imperfection was detected.

* * * * *